United States Patent
Park et al.

(10) Patent No.: US 7,630,283 B2
(45) Date of Patent: Dec. 8, 2009

(54) OPTICAL DISC, METHOD AND APPARATUS FOR MANAGING A DEFECTIVE AREA ON AN OPTICAL DISC OF WRITE ONCE TYPE

(75) Inventors: Yong Cheol Park, Gwachon-si (KR); Sung Dae Kim, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 809 days.

(21) Appl. No.: 10/670,326

(22) Filed: Sep. 26, 2003

(65) Prior Publication Data

US 2004/0062159 A1 Apr. 1, 2004

(30) Foreign Application Priority Data

Sep. 26, 2002 (KR) ........................ 10-2002-0058515
Jan. 14, 2003 (KR) ........................ 10-2003-0002330

(51) Int. Cl.
*G11B 7/00* (2006.01)
(52) U.S. Cl. ................................. 369/53.17; 369/47.14
(58) Field of Classification Search .............. 369/53.17, 369/47.14
See application file for complete search history.

(56) References Cited

U.S. PATENT DOCUMENTS

| | | |
|---|---|---|
| 4,558,446 A | 12/1985 | Banba et al. |
| 4,733,386 A | 3/1988 | Shimoi et al. |
| 4,807,205 A | 2/1989 | Picard et al. |
| 4,963,866 A | 10/1990 | Duncan |
| 5,068,842 A | 11/1991 | Naito et al. |
| 5,111,444 A | 5/1992 | Fukushima et al. |
| 5,210,734 A | 5/1993 | Sakurai et al. |
| 5,235,585 A | 8/1993 | Bish et al. |
| 5,237,553 A | 8/1993 | Fukushima et al. |
| 5,247,494 A | 9/1993 | Ohno et al. |

(Continued)

FOREIGN PATENT DOCUMENTS

CN 1134017 A 10/1996

(Continued)

OTHER PUBLICATIONS

JIS handbook data processing for hardware, Japan, Japanese Standards Association Inc., Apr. 21, 1999, pp. 1064-1070.

*Primary Examiner*—Wayne R Young
*Assistant Examiner*—LaTanya Bibbins
(74) *Attorney, Agent, or Firm*—Birch, Stewart, Kolasch & Birch, LLP

(57) ABSTRACT

A defective area on a write-once type optical recording medium, e.g., such as a BD-WO, is effectively managed with a method that can efficiently replace and/or record data that has been recorded in a defective area of the disc, e.g., in a spare area of a data area of the BD-WO. During the reproduction of data, the data that has been recorded and replaced can be read out and reproduced from an area other than a spare area. New TDFL information may be recorded cumulatively with the previous TDFL information as defect management information for the defective area, or repeatedly recorded at least twice in a certain recording region, e.g., a recording region chosen from a lead-in area, the data area, and a lead-out area, so that the temporary defect list information can be accurately and reliably secured.

26 Claims, 11 Drawing Sheets

U.S. PATENT DOCUMENTS

| | | | |
|---|---|---|---|
| 5,319,626 A | 6/1994 | Ozaki et al. | |
| 5,404,357 A | 4/1995 | Ito et al. | |
| 5,442,611 A | 8/1995 | Hosaka et al. | |
| 5,448,728 A | 9/1995 | Takano et al. | |
| 5,475,820 A | 12/1995 | Natrasevschi et al. | |
| 5,481,519 A | 1/1996 | Hosoya et al. | |
| 5,495,466 A | 2/1996 | Dohmeier et al. | |
| 5,528,571 A | 6/1996 | Funahashi et al. | |
| 5,553,045 A | 9/1996 | Obata et al. | |
| 5,577,194 A | 11/1996 | Wells et al. | |
| 5,608,715 A | 3/1997 | Yokogawa et al. | |
| 5,715,221 A | 2/1998 | Ito et al. | |
| 5,720,030 A | 2/1998 | Kamihara et al. | |
| 5,740,435 A | 4/1998 | Yamamoto et al. | |
| 5,745,444 A | 4/1998 | Ichikawa et al. | |
| 5,799,212 A | 8/1998 | Ohmori et al. | |
| 5,802,028 A | 9/1998 | Igarashi et al. | |
| 5,805,536 A | 9/1998 | Gage et al. | |
| 5,848,038 A | 12/1998 | Igarashi et al. | |
| 5,867,455 A | 2/1999 | Miyamoto et al. | |
| 5,878,020 A | 3/1999 | Takahashi | |
| 5,914,928 A | 6/1999 | Takahashi et al. | |
| 5,940,702 A | 8/1999 | Sakao et al. | |
| 6,058,085 A | 5/2000 | Obata et al. | |
| 6,118,608 A | 9/2000 | Kakihara et al. | |
| 6,138,203 A | 10/2000 | Inokuchi et al. | |
| 6,160,778 A * | 12/2000 | Ito et al. | 369/53.15 |
| 6,189,118 B1 * | 2/2001 | Sasaki et al. | 714/710 |
| 6,233,654 B1 | 5/2001 | Aoki et al. | |
| 6,249,884 B1 * | 6/2001 | Joo | 714/42 |
| 6,292,445 B1 | 9/2001 | Ito et al. | |
| 6,341,109 B1 | 1/2002 | Kayanuma et al. | |
| 6,341,278 B1 | 1/2002 | Yamamoto et al. | |
| 6,373,800 B1 | 4/2002 | Takahashi et al. | |
| 6,405,332 B1 | 6/2002 | Bando et al. | |
| 6,414,923 B1 | 7/2002 | Park et al. | |
| 6,447,126 B1 | 9/2002 | Hornbeck | |
| 6,466,532 B1 | 10/2002 | Ko et al. | |
| 6,469,978 B1 * | 10/2002 | Ohata et al. | 369/275.3 |
| 6,477,126 B1 | 11/2002 | Park et al. | |
| 6,480,446 B1 * | 11/2002 | Ko | 369/47.14 |
| 6,493,301 B1 | 12/2002 | Park et al. | |
| 6,496,807 B1 | 12/2002 | Inokuchi et al. | |
| 6,529,458 B1 | 3/2003 | Shin et al. | |
| 6,542,450 B1 | 4/2003 | Park et al. | |
| 6,564,345 B1 * | 5/2003 | Kim et al. | 714/723 |
| 6,581,167 B1 | 6/2003 | Gotoh et al. | |
| 6,606,285 B1 * | 8/2003 | Ijtsma et al. | 369/47.1 |
| 6,615,363 B1 | 9/2003 | Fukasawa et al. | |
| 6,631,106 B1 | 10/2003 | Numata et al. | |
| 6,633,724 B1 | 10/2003 | Hasegawa et al. | |
| 6,667,939 B1 | 12/2003 | Miyamoto et al. | |
| 6,671,249 B2 | 12/2003 | Horie et al. | |
| 6,697,306 B2 | 2/2004 | Sako et al. | |
| 6,714,502 B2 | 3/2004 | Ko et al. | |
| 6,724,701 B2 | 4/2004 | Ijtsma et al. | |
| 6,738,341 B2 | 5/2004 | Ohata et al. | |
| 6,754,860 B2 | 6/2004 | Kim et al. | |
| 6,760,288 B2 | 7/2004 | Ijtsma et al. | |
| 6,763,429 B1 | 7/2004 | Hirayama et al. | |
| 6,766,418 B1 | 7/2004 | Alexander et al. | |
| 6,785,206 B1 | 8/2004 | Lee et al. | |
| 6,788,631 B1 | 9/2004 | Park et al. | |
| 6,795,389 B1 | 9/2004 | Nishiuchi et al. | |
| 6,804,797 B2 | 10/2004 | Ko et al. | |
| 6,826,140 B2 | 11/2004 | Brommer et al. | |
| 6,842,580 B1 | 1/2005 | Ueda et al. | |
| 6,845,069 B2 | 1/2005 | Nakahara et al. | |
| 6,883,111 B2 | 4/2005 | Yoshida et al. | |
| 6,918,003 B2 | 7/2005 | Sasaki et al. | |
| 6,934,236 B2 * | 8/2005 | Lee et al. | 369/59.11 |
| 6,999,398 B2 | 2/2006 | Yamamoto et al. | |
| 7,002,882 B2 | 2/2006 | Takahashi et al. | |
| 7,027,059 B2 | 4/2006 | Hux et al. | |
| 7,027,373 B2 | 4/2006 | Ueda et al. | |
| 7,042,825 B2 | 5/2006 | Yamamoto et al. | |
| 7,050,701 B1 | 5/2006 | Sasaki et al. | |
| 7,092,334 B2 | 8/2006 | Choi et al. | |
| 7,123,556 B2 | 10/2006 | Ueda et al. | |
| 7,149,930 B2 | 12/2006 | Ogawa et al. | |
| 7,161,879 B2 | 1/2007 | Hwang et al. | |
| 7,184,377 B2 | 2/2007 | Ito et al. | |
| 7,188,271 B2 | 3/2007 | Park et al. | |
| 7,233,550 B2 | 6/2007 | Park et al. | |
| 7,236,687 B2 | 6/2007 | Kato et al. | |
| 7,272,086 B2 | 9/2007 | Hwang et al. | |
| 7,289,404 B2 | 10/2007 | Park et al. | |
| 7,296,178 B2 | 11/2007 | Yoshida et al. | |
| 7,313,066 B2 | 12/2007 | Hwang et al. | |
| 7,327,654 B2 | 2/2008 | Hwang et al. | |
| 7,349,301 B2 | 3/2008 | Terada et al. | |
| 7,379,402 B2 * | 5/2008 | Ko et al. | |
| 2001/0009537 A1 * | 7/2001 | Park | 369/47.14 |
| 2001/0011267 A1 | 8/2001 | Kihara et al. | |
| 2001/0026511 A1 | 10/2001 | Ueda et al. | |
| 2001/0043525 A1 | 11/2001 | Ito et al. | |
| 2002/0025138 A1 | 2/2002 | Isobe et al. | |
| 2002/0097665 A1 | 7/2002 | Ko et al. | |
| 2002/0097666 A1 | 7/2002 | Ko et al. | |
| 2002/0099950 A1 | 7/2002 | Smith | |
| 2002/0136118 A1 | 9/2002 | Takahashi | |
| 2002/0136134 A1 | 9/2002 | Ito et al. | |
| 2002/0136537 A1 * | 9/2002 | Takahashi | 386/95 |
| 2002/0159382 A1 | 10/2002 | Ohata et al. | |
| 2002/0161774 A1 | 10/2002 | Tol et al. | |
| 2002/0176341 A1 | 11/2002 | Ko et al. | |
| 2003/0072236 A1 | 4/2003 | Hirotsune et al. | |
| 2003/0095482 A1 | 5/2003 | Hung et al. | |
| 2003/0126527 A1 | 7/2003 | Kim et al. | |
| 2003/0135800 A1 | 7/2003 | Kim et al. | |
| 2003/0137909 A1 | 7/2003 | Ito et al. | |
| 2003/0137910 A1 | 7/2003 | Ueda et al. | |
| 2003/0142608 A1 | 7/2003 | Yamamoto et al. | |
| 2003/0149918 A1 | 8/2003 | Takaichi | |
| 2003/0173669 A1 | 9/2003 | Shau | |
| 2003/0198155 A1 | 10/2003 | Go et al. | |
| 2004/0001408 A1 | 1/2004 | Propps et al. | |
| 2004/0004917 A1 | 1/2004 | Lee | |
| 2004/0062159 A1 | 4/2004 | Park et al. | |
| 2004/0062160 A1 | 4/2004 | Park et al. | |
| 2004/0076096 A1 | 4/2004 | Hwang et al. | |
| 2004/0105363 A1 * | 6/2004 | Ko et al. | 369/47.14 |
| 2004/0114474 A1 | 6/2004 | Park et al. | |
| 2004/0120233 A1 | 6/2004 | Park et al. | |
| 2004/0125716 A1 | 7/2004 | Ko et al. | |
| 2004/0125717 A1 | 7/2004 | Ko et al. | |
| 2004/0136292 A1 | 7/2004 | Park et al. | |
| 2004/0145980 A1 | 7/2004 | Park et al. | |
| 2004/0158768 A1 | 8/2004 | Park et al. | |
| 2004/0174782 A1 | 9/2004 | Lee et al. | |
| 2004/0174785 A1 | 9/2004 | Ueda et al. | |
| 2004/0179445 A1 | 9/2004 | Park et al. | |
| 2004/0179458 A1 | 9/2004 | Hwang et al. | |
| 2004/0193946 A1 | 9/2004 | Park et al. | |
| 2004/0223427 A1 | 11/2004 | Kim et al. | |
| 2004/0246851 A1 | 12/2004 | Hwang et al. | |
| 2005/0007910 A1 | 1/2005 | Ito et al. | |
| 2005/0008346 A1 | 1/2005 | Noguchi et al. | |
| 2005/0025007 A1 | 2/2005 | Park | |
| 2005/0047294 A1 | 3/2005 | Park | |
| 2005/0050402 A1 | 3/2005 | Koda et al. | |
| 2005/0052972 A1 | 3/2005 | Park | |
| 2005/0052973 A1 | 3/2005 | Park | |
| 2005/0055500 A1 | 3/2005 | Park | |

| | | | | | | |
|---|---|---|---|---|---|---|
| 2005/0060489 | A1 | 3/2005 | Park | JP | 10-187360 | 7/1998 |
| 2005/0068877 | A1 | 3/2005 | Yeo | JP | 10-187361 A1 | 7/1998 |
| 2005/0083740 | A1 | 4/2005 | Kobayashi | JP | 11-110888 A | 4/1999 |
| 2005/0083767 | A1 | 4/2005 | Terada et al. | JP | 11-203792 A | 7/1999 |
| 2005/0083830 | A1 | 4/2005 | Martens et al. | JP | 2000-090588 | 3/2000 |
| 2005/0195716 | A1 | 9/2005 | Ko et al. | JP | 2000-149449 | 5/2000 |
| 2005/0207262 | A1 | 9/2005 | Terada et al. | JP | 2000-195178 A | 7/2000 |
| 2005/0289389 | A1 | 12/2005 | Yamagami et al. | JP | 2000-215612 | 8/2000 |
| 2006/0077827 | A1 | 4/2006 | Takahashi | JP | 2000-285607 A | 10/2000 |
| 2006/0195719 | A1 | 8/2006 | Ueda et al. | JP | 2000-293948 A | 10/2000 |
| 2006/0203635 | A1 | 9/2006 | Ko et al. | JP | 2001-023317 A | 1/2001 |
| 2006/0203638 | A1 | 9/2006 | Ko et al. | JP | 2001-069440 A | 3/2001 |
| 2006/0203684 | A1 | 9/2006 | Ko et al. | JP | 2001-110168 A | 4/2001 |
| 2006/0227694 | A1 | 10/2006 | Woerlee et al. | JP | 2001-351334 A | 12/2001 |
| 2007/0294571 | A1 | 12/2007 | Park et al. | JP | 2001-357623 A | 12/2001 |
| 2008/0046780 | A1 | 2/2008 | Shibuya et al. | JP | 2002-015507 A | 1/2002 |
| | | | | JP | 2002-015525 A | 1/2002 |
| | | | | JP | 2002-056619 A | 2/2002 |

FOREIGN PATENT DOCUMENTS

| | | | | | |
|---|---|---|---|---|---|
| CN | 1140897 C | 1/1997 | JP | 2002-215612 A | 8/2002 |
| CN | 1227950 A | 9/1999 | JP | 2002-245723 A | 8/2002 |
| CN | 1273419 A | 11/2000 | JP | 2002-288938 A | 10/2002 |
| CN | 1342314 A | 3/2002 | JP | 2002-329321 A | 11/2002 |
| CN | 1675708 A | 9/2005 | JP | 2002-352522 A | 12/2002 |
| CN | 1685426 A | 10/2005 | JP | 2003-536194 A | 12/2003 |
| DE | 199 54 054 A1 | 6/2000 | JP | 2004-280864 A | 10/2004 |
| EP | 0314186 | 5/1989 | JP | 2004-280865 A | 10/2004 |
| EP | 0325823 A1 | 8/1989 | JP | 2005-004912 A | 6/2005 |
| EP | 0350920 A2 | 1/1990 | JP | 2005-535993 | 11/2005 |
| EP | 0464811 A2 | 1/1992 | JP | 2005-538490 A | 12/2005 |
| EP | 0472484 A2 | 2/1992 | JP | 2005-538491 A | 12/2005 |
| EP | 0477503 A2 | 4/1992 | JP | 2006-519445 A | 8/2006 |
| EP | 0556046 A1 | 8/1993 | KR | 10-2002-87483 A | 11/2002 |
| EP | 0871172 A2 | 10/1998 | KR | 1020040094301 A | 11/2004 |
| EP | 0908882 A2 | 4/1999 | RU | 2005 103 626 | 9/2005 |
| EP | 0974967 A1 | 1/2000 | RU | 2005 127 337 | 2/2006 |
| EP | 0989554 A1 | 3/2000 | TW | 371752 | 10/1999 |
| EP | 0 997 904 A1 | 5/2000 | TW | 413805 | 12/2000 |
| EP | 1 026 681 A1 | 8/2000 | WO | WO-84/00628 A1 | 2/1984 |
| EP | 1026681 B1 | 8/2000 | WO | WO-96/30902 A1 | 10/1996 |
| EP | 1043723 A1 | 10/2000 | WO | WO-97/22182 A1 | 6/1997 |
| EP | 1 132 914 A2 | 9/2001 | WO | WO-00/54274 A1 | 9/2000 |
| EP | 1 148 493 A2 | 10/2001 | WO | WO-01/22416 A1 | 3/2001 |
| EP | 1148493 A2 | 10/2001 | WO | WO-01/93035 A2 | 12/2001 |
| EP | 1152414 A2 | 11/2001 | WO | WO-03/007296 A1 | 1/2003 |
| EP | 1239478 A1 | 9/2002 | WO | WO-03/025924 A1 | 3/2003 |
| EP | 1274081 A2 | 1/2003 | WO | WO-03/079353 A1 | 9/2003 |
| EP | 1298659 A1 | 4/2003 | WO | WO-2004/015707 A1 | 2/2004 |
| EP | 1329888 A1 | 7/2003 | WO | WO-2004/015708 A1 | 2/2004 |
| EP | 1347452 A2 | 9/2003 | WO | WO-2004/015780 A1 | 2/2004 |
| EP | 1547065 A0 | 6/2005 | WO | WO-2004/025648 A1 | 3/2004 |
| EP | 1564740 A1 | 8/2005 | WO | WO-2004/025649 A1 | 3/2004 |
| EP | 1573723 A0 | 9/2005 | WO | WO-2004/029668 A2 | 4/2004 |
| EP | 1612790 A1 | 1/2006 | WO | WO-2004/029941 A1 | 4/2004 |
| EP | 1623422 A0 | 2/2006 | WO | WO-2004/034396 A1 | 4/2004 |
| GB | 2356735 A | 5/2001 | WO | WO-2004/036561 A1 | 4/2004 |
| JP | 63-091842 A | 4/1988 | WO | WO-2004/053872 A1 | 6/2004 |
| JP | 01-263955 A | 10/1989 | WO | WO-2004/053874 A1 | 6/2004 |
| JP | 2-023417 | 1/1990 | WO | WO-2004/068476 A1 | 8/2004 |
| JP | 05-274814 A | 10/1993 | WO | WO-2004/075180 A1 | 9/2004 |
| JP | 06-349201 A | 12/1994 | WO | WO-2004/079631 A2 | 9/2004 |
| JP | 08-096522 A | 4/1996 | WO | WO-2004/079731 A1 | 9/2004 |
| JP | 09-145634 A | 6/1997 | WO | WO-2004/079740 A1 | 9/2004 |
| JP | 09-231053 A | 9/1997 | WO | WO-2004/081926 A1 | 9/2004 |
| JP | 10-050005 A | 2/1998 | WO | WO-2004/093035 A1 | 10/2004 |
| JP | 10-050032 A | 2/1998 | WO | WO-2004/100155 A1 | 11/2004 |
| JP | 10-187356 | 7/1998 | WO | WO-2004/100156 A1 | 11/2004 |
| JP | 10-187357 | 7/1998 | WO | WO-2005/004123 A1 | 1/2005 |
| JP | 10-187358 | 7/1998 | WO | WO-2005/004154 A2 | 1/2005 |
| JP | 10-187359 | 7/1998 | | | |

* cited by examiner

FIG. 4A
Single Layer BD-WO
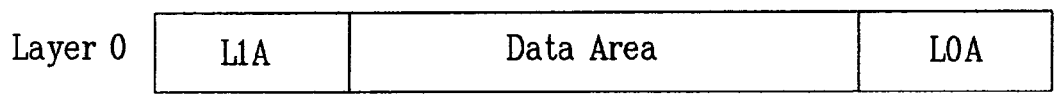
FIG. 4B
dUAL Layer BD-WO
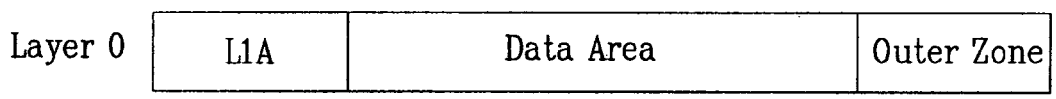
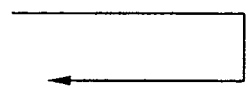
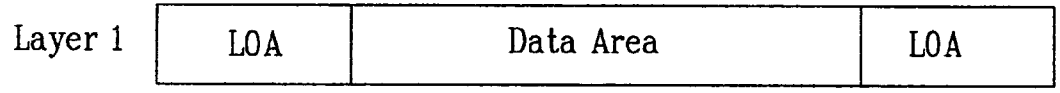

OPTICAL DISC, METHOD AND APPARATUS FOR MANAGING A DEFECTIVE AREA ON AN OPTICAL DISC OF WRITE ONCE TYPE

This application claims the benefit of the Korean Patent Application Nos. 2002-058515 filed on Sep. 26, 2002 and 2003-002330 filed on Jan. 14, 2003, the entirety of each of which are hereby incorporated by reference.

BACKGROUND OF THE INVENTION

1. Field of the Invention

The present invention relates to a method for managing a defective area on a high density optical disc, and more particularly to a write once optical disc, an apparatus and a method for managing and efficiently recording defect management information for a defective area on a high density optical disc such as a Blu-ray Disc Write Once (BD-WO) type.

2. Background of the Related Art

Optical discs on which a large capacity of data can be written as optical recording media have been widely used in the background art. Among these new high density physical formats being developed is a new HD-DVD (High-Density Digital Versatile Disc) on which high quality video and audio data can be written and stored in large quantities, e.g., a BD (Blu-ray Disc).

The Blu-ray disc is the next-generation optical recording solution that can surpass the data recording capability of existing DVDs. The world standard specifications for the Blu-ray disc HD-DVD have recently been established. The Blu-ray disc uses a celadon (blue-ultraviolet) laser having a wavelength of 405 nm that is much denser than the red laser having a wavelength of 650 nm that is typically used for existing DVD technology. Accordingly, a larger amount of data than the existing DVD can be stored on the Blu-ray disc that has a thickness of 1.2 mm, a diameter of 12 cm, and an optical transmission layer having a thickness of 0.1 mm.

SUMMARY OF THE INVENTION

Accordingly, the present invention is directed to a method of managing a defective area on an optical disc write once that substantially obviates one or more problems due to limitations and disadvantages of the related art.

An object of the present invention is to provide a method of managing a defective area on an optical disc of write once type that can efficiently replace data recorded in a defective area of a disc as replacement data.

An object of the present invention is to provide a method of managing a defective area on an optical disc of write once type that can efficiently record replacement data in a spare area to prevent data recording errors.

One or more of these and other objects of the present invention are accomplished by a method for managing an optical recording medium having at least one defective area in a user data area, the method comprising recording data recorded in the defective area in a spare area of the optical recording medium as replacement data and providing a first temporary defect list having a defect entry for the at least one defective area; and recording a cumulative temporary defect list for an additional defective area in the user data area, wherein the cumulative temporary defect list includes the first temporary defect list previously recorded and at least one additional defective entry for any additional defective area.

One or more of these and other objects of the present invention are further accomplished by a recording medium comprising at least one spare area within a data area; a temporary defect management area for managing replacement data of at least one defective area within a user data area of the data area; and a cumulative temporary defect list stored within the temporary defect management area, wherein the cumulative temporary defect list includes management information for the replacement data of the at least one defective area cumulatively recorded and management information for replacement data for at least one additional defective area of the user data area.

One or more of these and other objects of the present invention are further accomplished by an apparatus for managing an optical recording medium having at least one temporary defect management area, and a spare area in a data area, the apparatus comprising a device for recording data recorded in at least one defective area of the spare area of the optical recording medium as replacement data and providing a first temporary defect list having a defect entry for the at least one defective area; and a device for recording a cumulative temporary defect list for an additional defective area in a user data area, wherein the cumulative temporary defect list includes the first temporary defect list previously recorded and at least one additional defective entry for any additional defective area.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4A and 4B illustrate a structure of a single layer BD-WO and a dual layer BD-WO optical disc, respectively, according to an embodiment of the present invention;

DETAILED DESCRIPTION OF THE INVENTION

Reference will now be made in detail to the method and apparatus for managing a defective area on an optical disc write once according to the preferred embodiments of the present invention, examples of which are illustrated in the accompanying drawings. Wherever possible, the same reference numbers will be used throughout the drawings to refer to the same or like parts.

Figure 1:
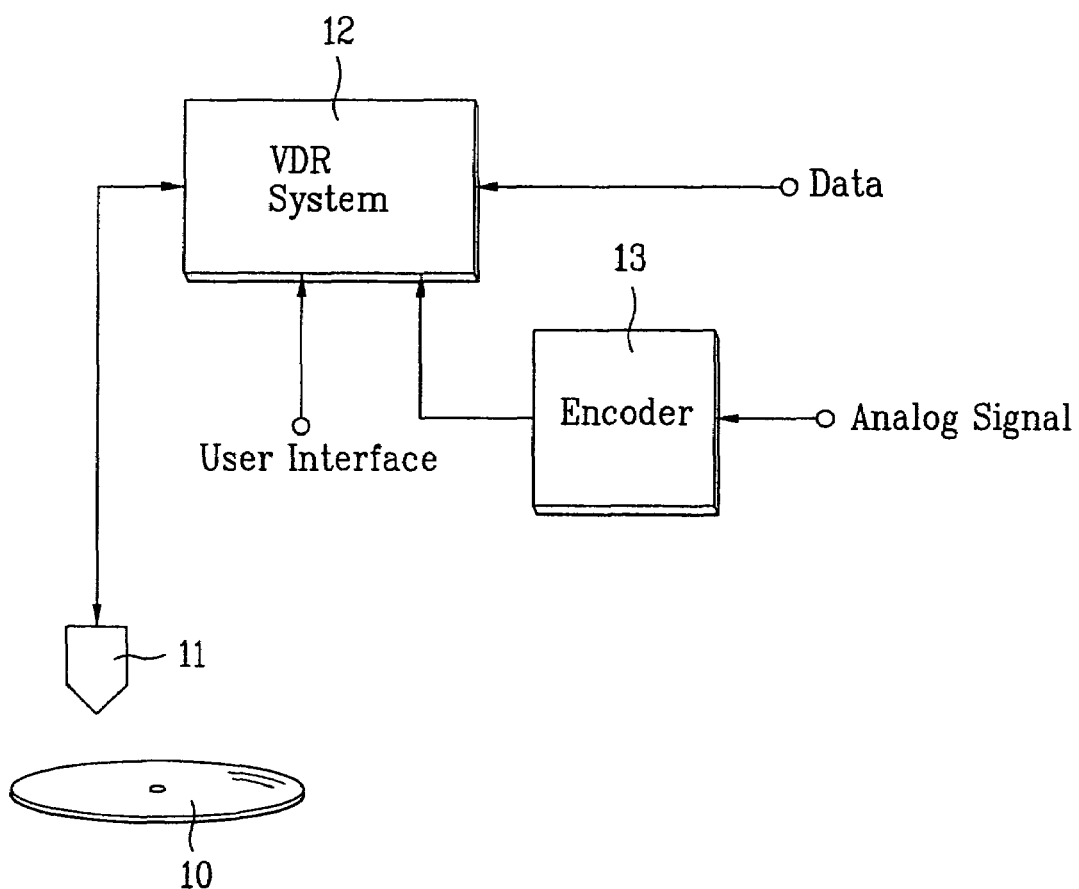
FIG. 1 schematically illustrates the construction of a general optical disc recording/reproducing apparatus according to an embodiment of the present invention.

As various kinds of standards relating to the Blu-ray disc have been prepared, standards for BD-RE (Blu-ray Disc Rewritable) and BD-WO (Blu-ray Disc Write once) are being developed for various applications. As seen in FIG. 1, an apparatus for recording/reproducing a signal on an optical disc, such as a BD-RE, may include an optical pickup 11 for recording/reproducing the signal on the optical disc 10, a VDR (Video Disc Recorder) system 12 for processing the signal readout from the optical pickup 11 or modulating an externally inputted data stream into a signal suitable for being recorded to process the modulated signal, and an encoder 13 for encoding an externally inputted analog signal and outputting the encoded signal to the VDR system 12.

Figure 2:
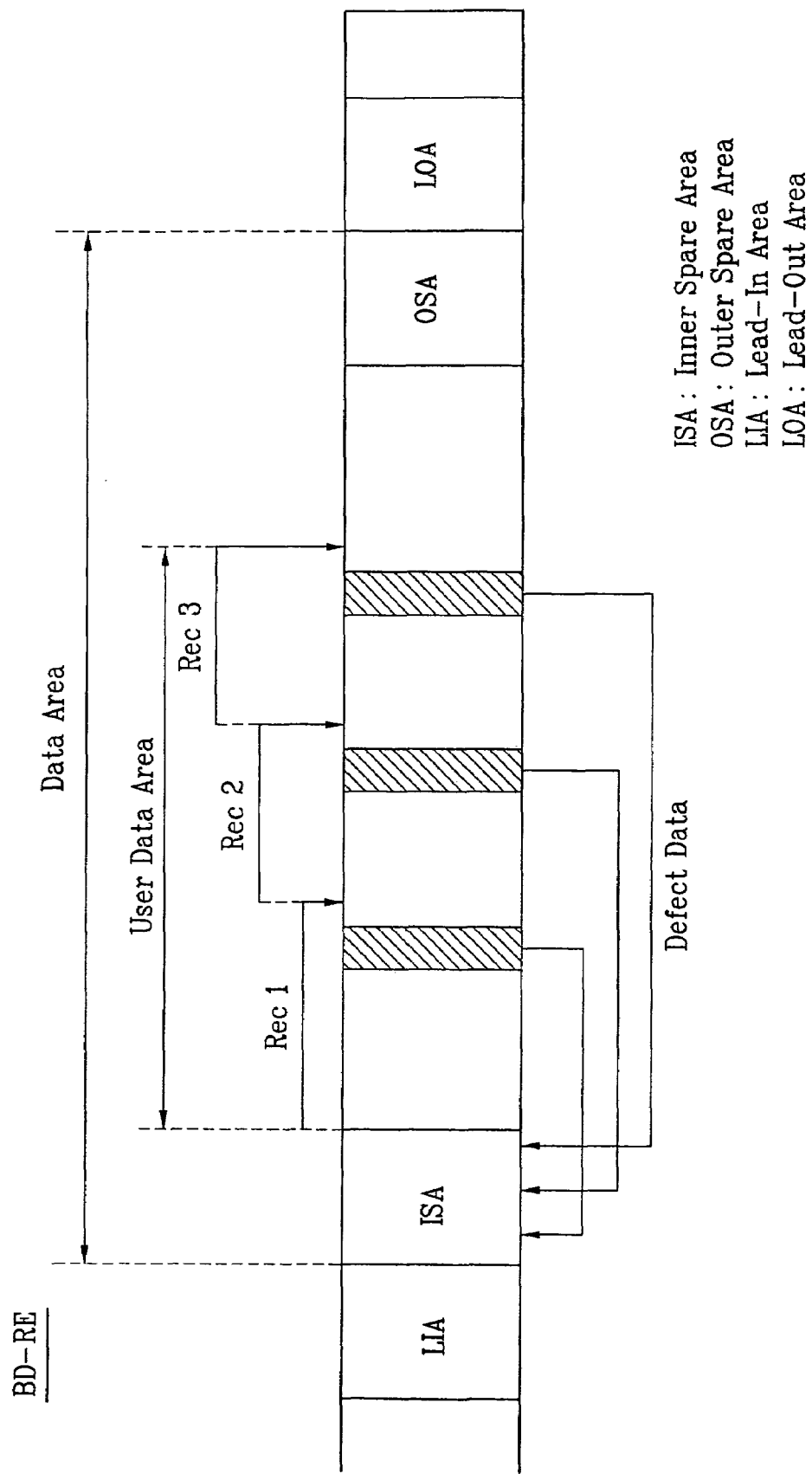
FIG. 2 illustrates a method of managing a defective area on a general BD-RE.

As seen in FIG. 2, the BD-RE is divided into, and assigned a lead-in area (LIA), a data area, and a lead-out area (LOA). The data area is provided with a user data area, and an inner spare area (ISA) and an outer spare area (OSA) assigned to a leading end and a rear end of the user data area, respectively.

The VDR system 12 of the optical disc recording/reproducing apparatus as constructed above encodes and modulates the externally inputted data into the signal suitable for being recorded, and then writes the modulated signal in a cluster, e.g., a unit that corresponds to the unit of an ECC (Error Correction Coding) block having a specified recording size. As shown in FIG. 2, if a defective area is detected in the data area during recording of the data, a series of replacement recording operations for replacement recording of the data recorded in the defective area are performed in a cluster of a spare area, e.g., in the ISA.

Accordingly, even if the defective area exists in the data area of the BD-RE, the VDR system 12 of the optical disc recording/reproducing apparatus records the data recorded in the defective area in the single cluster in the spare area. During the reproduction of data, the VDR system 12 reads out and reproduces the data replaced/recorded in the spare area, so that any data recording errors can be prevented in advance.

As the name of the BD-WO may suggest, data can be written only once on the BD-WO and is not re-writable on the BD-WO. However, the BD-WO can be read repeatedly. As a result, the BD-WO is useful where the rewritability of data on a recording medium is not desired or essential. However, an efficient defective area management scheme for the BD-WO, the second standardization of Blu-ray disc discussed hereinabove, has not yet been prepared and is therefore required.

Figure 3:
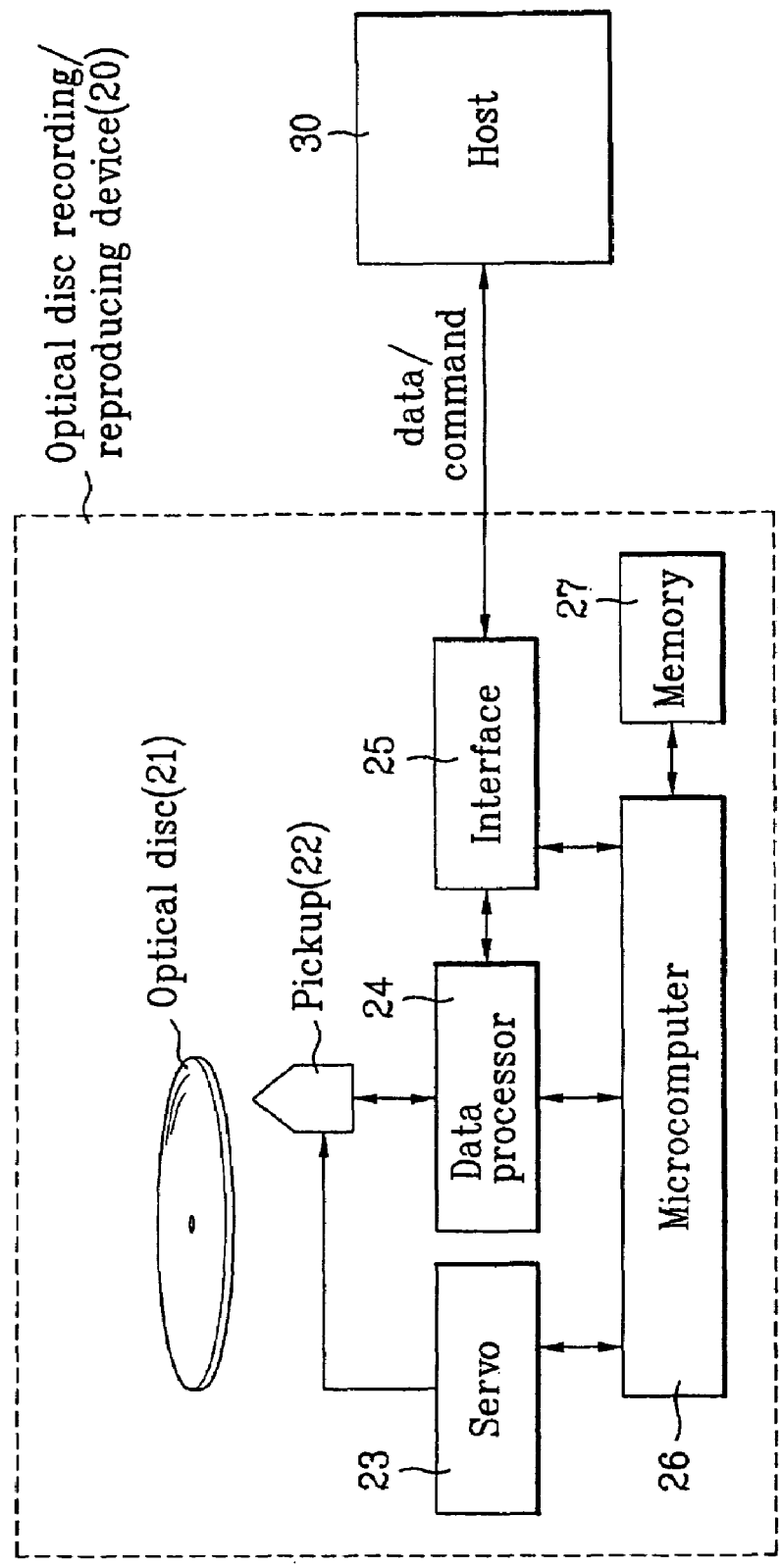
FIG. 3 is a block diagram of an optical disc recording and reproducing device according to another embodiment of the present invention.

FIG. 3 is a block diagram of an optical disc recording and/or reproducing device 20 according to a preferred embodiment of the present invention. The optical disc recording and/or reproducing device 20 (hereinafter optical disc recording/reproducing device) includes an optical pickup 22 for writing and reading data to and from an optical recording medium 21, a servo unit 23 for controlling the pickup 22 to maintain a distance between an objective lens of the pickup 22 and the recording medium 21 and for tracking relevant tracks on the recording medium 21, a data processor 24 for processing and supplying input data to the pickup 22 for writing, and for processing data read from the recording medium 21, an interface 25 for exchanging data and/or commands with any external host 30, a memory or storage 27 for storing information and data therein including defect management data associated with the recording medium 21, and a microprocessor or controller 26 for controlling the operations and elements of the recording/reproducing device 20.

Data to be written or read to or from the recording medium 21 may also be stored in the memory 27. All the components of the recording/reproducing device 20 are operatively coupled. In the exemplary embodiment shown, the recording medium 21 is a recording medium of write-once type, e.g., such as a BD-WO.

FIGS. 4A and 4B illustrate a structure of a single layer BD-WO and a dual layer BD-WO optical disc, respectively, according to an embodiment of the present invention. As shown in FIGS. 4A and 4B, the BD-WO can have one or two recording layers. In FIG. 4A, a BD-WO having only a single recording layer (Layer 0) includes a single recording layer composed of a lead-in area (LIA), a data area, and a lead-out area (LOA), and is referred to herein as a single layer disc.

In FIG. 4B, a dual layer BD-WO includes two recording layers (Layers 0 and 1) and is referred to hereinafter as a dual layer disc. The first recording layer (Layer 0) includes a LIA, a data area, and an outer zone. The second recording layer (Layer 1) includes a LOA, a data area and an outer zone. Generally, a data writing occurs in the direction shown with the dotted arrow in the dual layer disc. The single layer disc can have a capacity of 23.3, 25.0 or 27.0 Gbytes, whereas the dual layer disc can have a capacity of 46.6, 50.0, or 54.0 Gbytes.

It should be noted that all the different embodiments of the present invention, e.g., various methods discussed hereinafter, are applicable to any type of an optical disc, such as a single layer BD-WO, a dual layer BD-WO or a BD-RE. Further, although the use of the optical disc recording/reproducing device 20 of FIG. 3 is discussed below in conjunction with the methods of the invention, the invention is not limited to such and encompasses other recording/reproducing devices as long as they are configured to implement the present methods. For instance, the device shown in either FIG. 1 or FIG. 3, e.g., the VDR system 12 or the optical disc recording/reproducing device 20 may be used to implement the present methods as needed.

Figure 5:
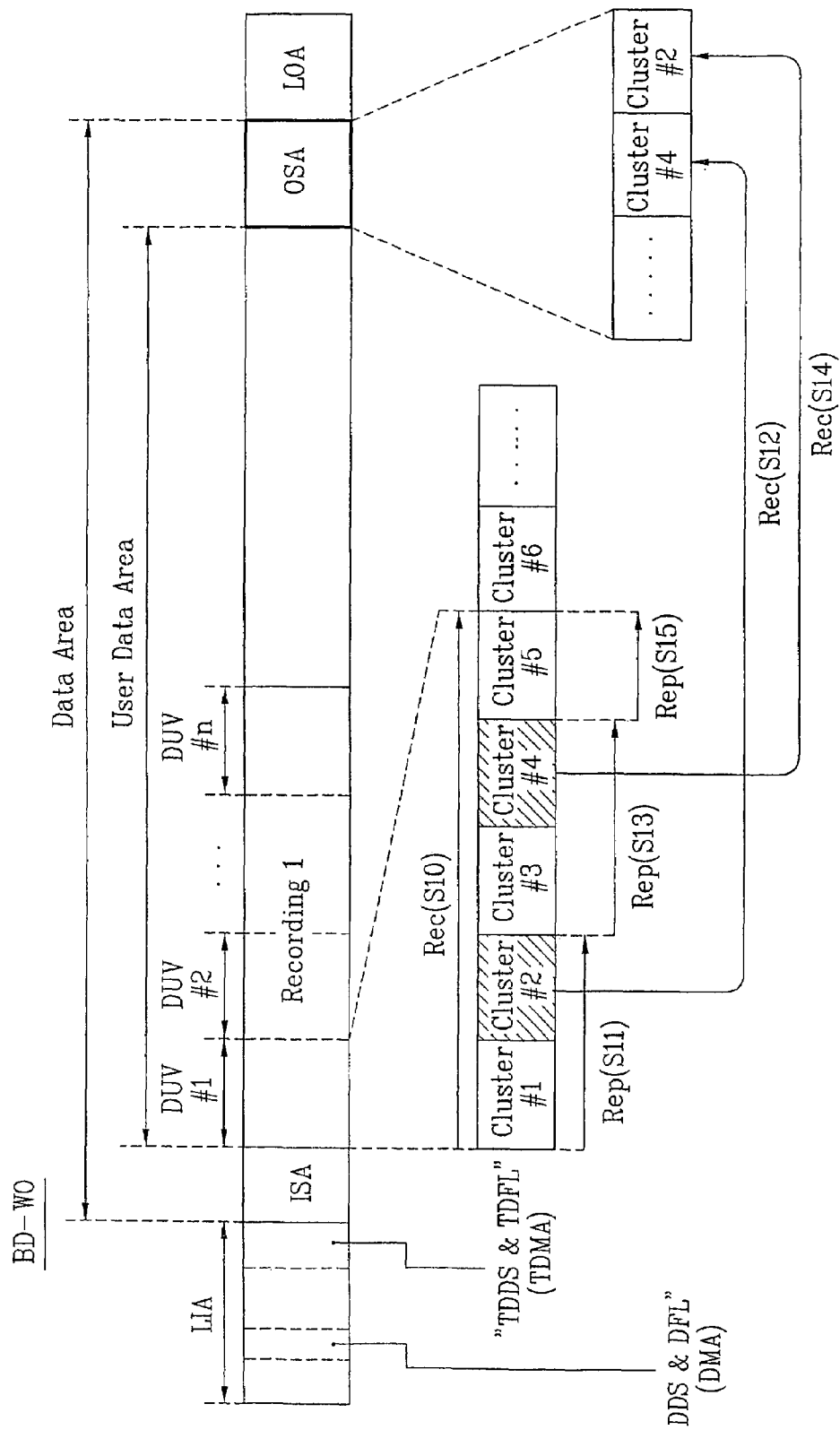
FIG. 5 illustrates a method of managing a defective area on an optical disc of write once type according to a first embodiment of the present invention.

FIG. 5 illustrates a method of managing a defective area on an optical disc of write once type according to a first embodiment of the present invention. For example, the BD-WO (Blu-ray Disc Write Once) includes an LIA (Lead-In Area), a data area, and an LOA (Lead-Out Area). The data area may be divided into a user data area where a PSN (Physical Sector Number) and an LSN (Logical Sector Number) are simultaneously given and a non-user data area where only the PSN is given.

The non-user data area, as shown in FIG. 5, is divided into an ISA (Inner Spare Area) and an OSA (Outer Spare Area) for replacement-recording data of a defective area. The LIA is divided into a TDMA (Temporary Defect Management Area) for temporarily recording management information of the defective area and the replacement-recorded data, and a DMA (Defect Management Area) for generally permanently recording defect management information. However, FIG. 5 shows only an example of the positions of the TDMA and the DMA, and their positions may be changed. For example, the DMA may also be arranged in the LOA, and the TDMA may additionally be arranged in the data area if needed.

In the case of a general rewritable optical disc, data can be repeatedly written in and erased from a DMA, even if the DMA has a limited size, and a DMA of a large size is therefore not required. However, in the case of an optical disc of write once type, once an area has been used for recording data, this area cannot be used for data recording again. Accordingly, a defect management area of a larger size is required in optical discs of this type. Also, if no further recording is made on the optical disc of write once type, e.g., in the case where the optical disc of write once type is finalized, the final TDMA information needs to be transferred to the DMA. This defect management area is referred to as the TDMA (Temporary DMA), e.g., as distinguished from the DMA. Accordingly, the TDMA can be regarded as a distinguishing feature of the structure of the optical disc of write once type according to the present invention.

In the TDMA, a TDFL (Temporary Defect List) where information on the defective areas and the position information of the replacement-recorded areas are recorded and managed in the form of a list and general management information of the disc are recorded. According to the present invention, a TDDS (Temporary Disc Definition Structure) for storing the position information of the TDFL is recorded in the TDMA. However, the structure and relationship between TDFL and TDDS will be explained in greater detail hereinafter with reference to FIGS. 6 and 7.

Meanwhile, the optical disc recording/reproducing device 20 as described above with reference to FIG. 3 sequentially records data in a predetermined recording region of the user data area during the data recording operation. In order to detect the defective area while the data recording operation is performed, a recording size corresponding to one or more physical tracks or recording unit(s) (in case of the BD-WO, a single cluster) may be set as a DVU (Defect Verifying Unit) in the predetermined recording region. In addition, this DVU can be set to have a range of sizes according to the design of the system.

Also, the optical disc recording/reproducing device 20 repeatedly performs a series of operations for detecting the defective area, which includes confirming whether the data is normally recorded by recording data in the DVU and then reproducing the data recorded in the DVU.

For example, as shown in FIG. 5, the optical disc recording/reproducing device 20 detects the defective area by sequentially recording data in first to fifth clusters Cluster #1-#5 as a first DVU (DVU #1, step S10), and then sequentially reproducing the data recorded in the first DVU. If the defective area is detected in the second cluster (step S11), the optical disc recording/reproducing device 20 performs the recording operation for replacement-recording the data of the second cluster, e.g., the data of the second cluster temporarily stored in an internal buffer (or the memory 27) of the optical disc recording/reproducing device 20, in the spare area (step S12). Although the process of replacement-recording the data in the OSA is shown in FIG. 5, it will be appreciated that the replacement-recording of data in the ISA is also possible.

The data of the second cluster may be replacement-recorded from the rear end of the OSA or from the fore or lead end thereof. The optical disc recording/reproducing device 20, after the aforementioned replacement recording operation, reproduces the data recorded in the third cluster of the first DVU again, and if the defective area is detected in the fourth cluster (step S13) at this time, the optical disc recording/reproducing device 20 performs the recording operation for replacement-recording the data of the fourth cluster, e.g., the data of the fourth cluster temporarily stored in the internal buffer or memory of the optical disc recording/reproducing device 20, in the spare area (step S14).

Accordingly, in the first DVU, normally recorded first, third and fifth clusters and two defective areas are recorded, and in the outer spare area, the second cluster and the fourth cluster are replacement-recorded.

If the data recording operation Recording 1 having a temporary sequence is terminated while the defective area detection and replacement recording operation as described above are repeatedly performed in the unit of a DVU, e.g., DVU #1, DVU #2, ..., DVU #n, the optical disc recording/reproducing device 20 records defect management information for managing the defective area and the replacement-recorded data as TDFL (Temporary Defect List) information. Accordingly, the method of recording the TDDS and the TDFL will be explained in greater detail hereinafter.

Figure 6:
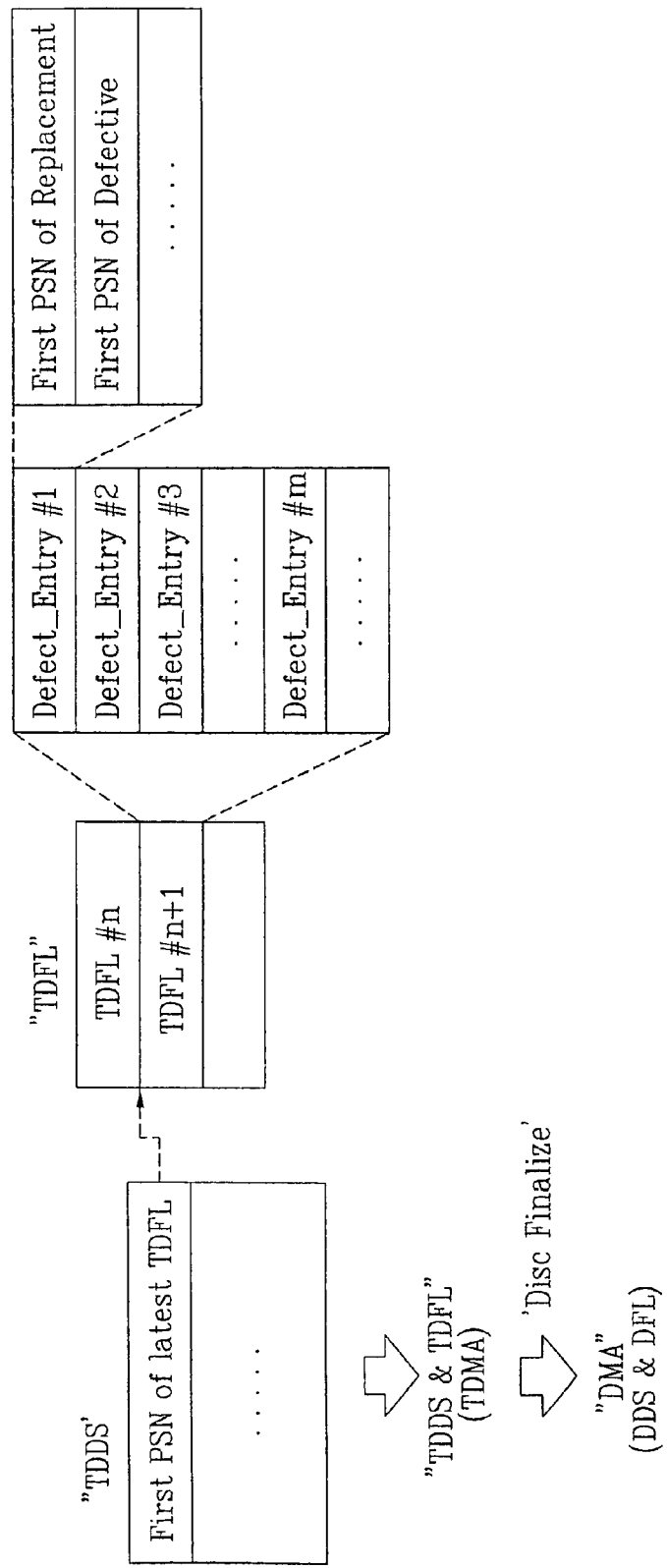
FIG. 6 illustrates management information created and recorded by the method of managing a defective area on an optical disc of write once type according to the first embodiment of the present invention.

FIG. 6 illustrates the structures of TDDS and TDFL and the relationship between the TDDS and the TDFL. The TDFL includes a plurality of entries. Each entry within the TDFL includes position information of the defective area (First PSN of Defective) and position information of the replacement-recorded area (First PSN of Replacement), e.g., this arrangement of entries has been used in the same manner as the existing rewritable optical disc. The TDDS is an area that includes information for managing the disc, and, especially with respect to the present invention, the TDDS has information on the position of the latest or most recent TDFL (First PSN of latest TDFL).

Accordingly, whenever a defective area is detected that requires management, the corresponding entry is recorded in the TDFL. After the recording in the TDFL is completed, information indicative of the position of the corresponding TDFL is recorded in the TDDS. Accordingly, the system can easily access the position of the latest updated TDFL by reproducing the TDDS, and efficient defect management becomes possible by confirming the entries of the corresponding TDFL.

The TDDS and the TDFL are recorded in the TDMA as shown in FIG. 6. If a user requests a disc finalization for terminating the data recording on the optical disc, a series of operations for copying and recording new TDDS and TDFL information stored in the TDMA into a separately arranged DMA are performed during the disc finalization. Accordingly, by confirming the DMA area during a reuse of the disc, it can be easily recognized that the corresponding disc is finalized and that the contents of the final TDDS and TDFL can be confirmed as well. In the case of the recording of the TDDS and the TDFL in the DMA, these structures are referred to as DDS (Disc Definition Structure) and DFL (Defect List), respectively, to indicate finalized information.

Figure 7:
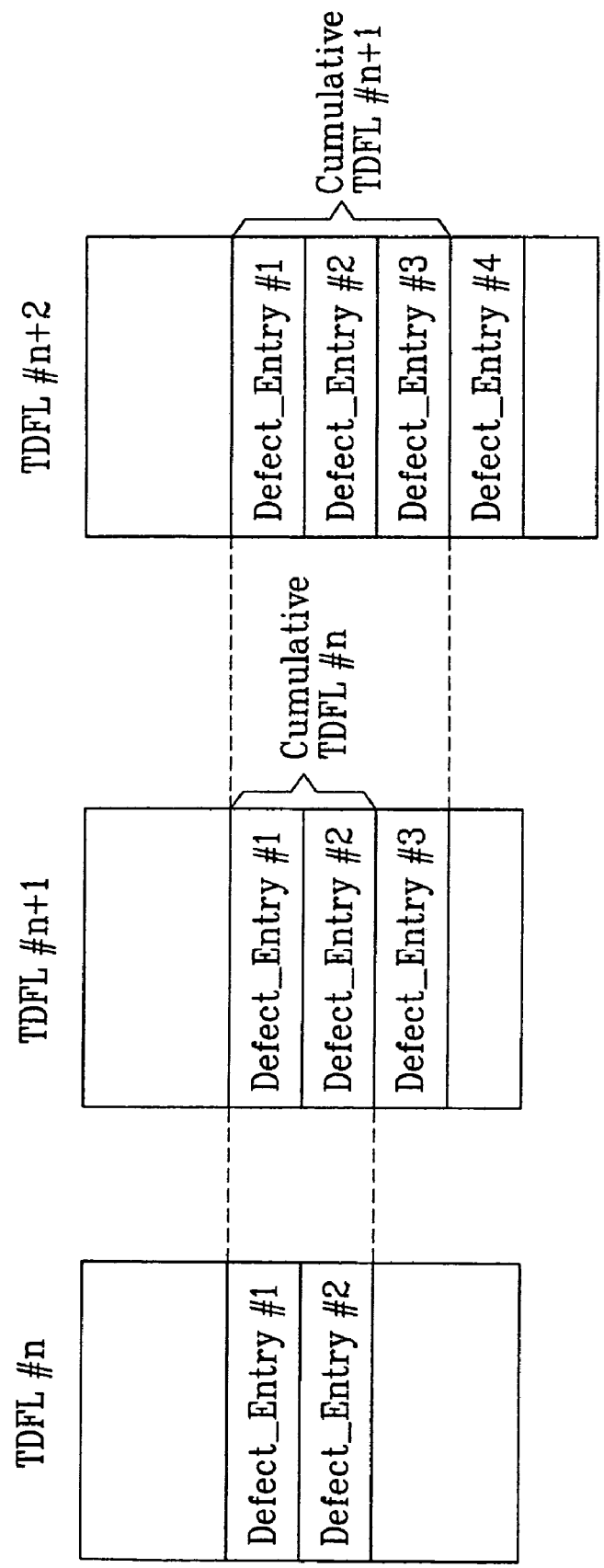
FIG. 7 illustrates a method of recording a temporary defect list on an optical disc of write once type according to the present invention.

FIG. 7 illustrates a method of recording a TDFL on an optical disc of write once type according to the first embodiment of the present invention. The main characteristic of this method is a cumulative use of the TDFL. Since the preservation of defect entries is critical to successful defect management, the cumulative recording method is used so that the entries can be protected cumulatively with previous TDFL information throughout the recording of the TDFL information. Further, by simply confirming the final TDFL information, all defect information produced up to that point can be conveniently confirmed at a single reference location.

Specifically, if two defect entries existed in the n-th recorded TDFL, the two n-th defect entries (Defect_Entry #1 and Defect_Entry #2) previously recorded are recorded during the recording of the TDFL #n+1, and then one entry Defect_Entry #3 newly produced is added to the TDFL #n+1. As a result, in the TDFL #n+1, three defect entries exist.

Although FIG. 7 illustrates an example where three entries are sequentially arranged, the present invention is not limited to this example. For instance, the entries may be recorded according to a specified sorting type such as Defect_Entry #3, #1, #2 and so on. In the same manner, the TDFL #n+2 includes the TDFL #n+1 information and a presently added new defect entry, e.g., Defect_Entry #4.

FIGS. 8-11 illustrate a method of managing a defective area on an optical disc of write once type according to a second embodiment of the present invention. Irrespective of the cumulative recording of TDFL according to the first embodiment, the second embodiment provides a repeated recording of TDFL presently updated in different areas of the disc. For example, if the TDFL (n+1)-th is to be updated, the TDFL (n+1)-th recorded with the contents of the TDFL n-th, and/or the entry added to the TDFL (n+1)-th, are recorded in different areas of the disc at least twice. Therefore, the second embodiment of the present invention, in the same manner as the first embodiment, provides a copy of the TDFL information in the disc as a backup in order to prevent the loss of important TDFL information.

Figure 8:
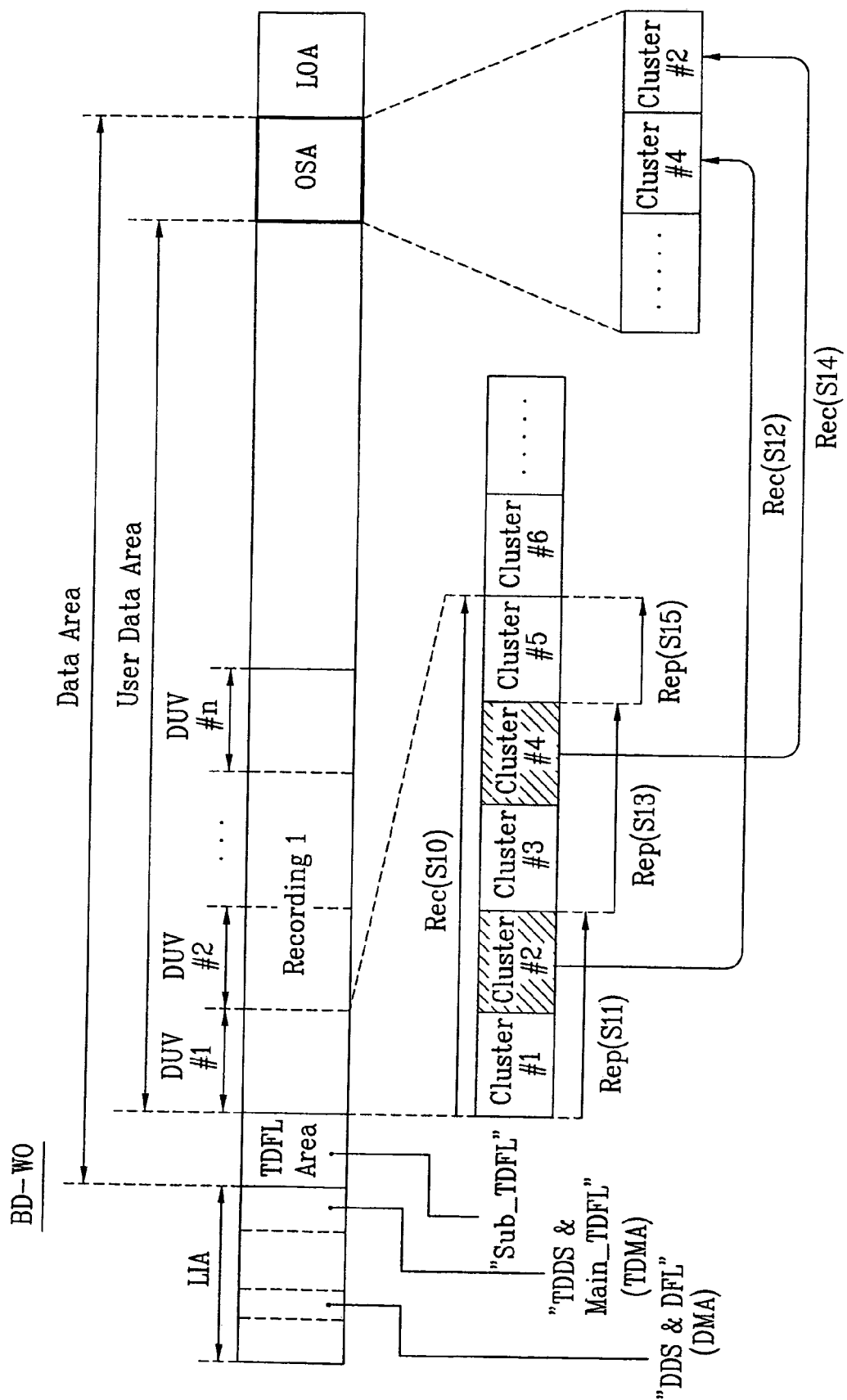
FIG. 8 illustrates a method of managing a defective area on an optical disc of write once type according to a second embodiment of the present invention.

More specifically, FIG. 8 illustrates a method of managing a defective area on an optical disc of write once type according to the second embodiment of the present invention. For example, the BD-WO (Blu-ray Disc Write Once) includes an LIA (Lead-In Area), a data area, and an LOA (Lead-Out Area). The data area may be divided into a user data area where a PSN (Physical Sector Number) and an LSN (Logical Sector Number) are simultaneously given and a non-user data area where only the PSN is given. The non-user data area, as shown in FIG. 8, is divided into an OSA (Outer Spare Area) for replacement-recording data of a defective area and a TDFL (Temporary Defect List) area for recording management information of the defective area and the replacement-recorded data.

The optical disc recording/reproducing device 20 as described above with reference to FIG. 3 sequentially records data in a predetermined recording region of the user data area of the BD-WO in FIG. 8 during the data recording operation. In order to detect the defective area while the data recording operation is performed, a recording size corresponding to one or more physical tracks or recording units (in case of the BD-WO, a single cluster) may be set as a DVU (Defect Verifying Unit) in the predetermined recording region. In addition, the DVU can be set to have a range of sizes according to the design of the system.

The optical disc recording/reproducing device 20 repeatedly performs a series of operations for detecting defective area(s), which includes confirming whether the data is normally recorded by recording data in the DVU, and then reproducing the data recorded in the DVU.

For example, as shown in FIG. 8, the optical disc recording/reproducing device 20 records the temporary defect list information in the TDMA dividedly arranged in the lead-in area as main TDFL Main_TDFL information, and repeatedly records the TDFL information in the TDFL area arranged in the head of the recording region of the data area as sub TDFL Sub_TDFL information as well.

Figure 9:
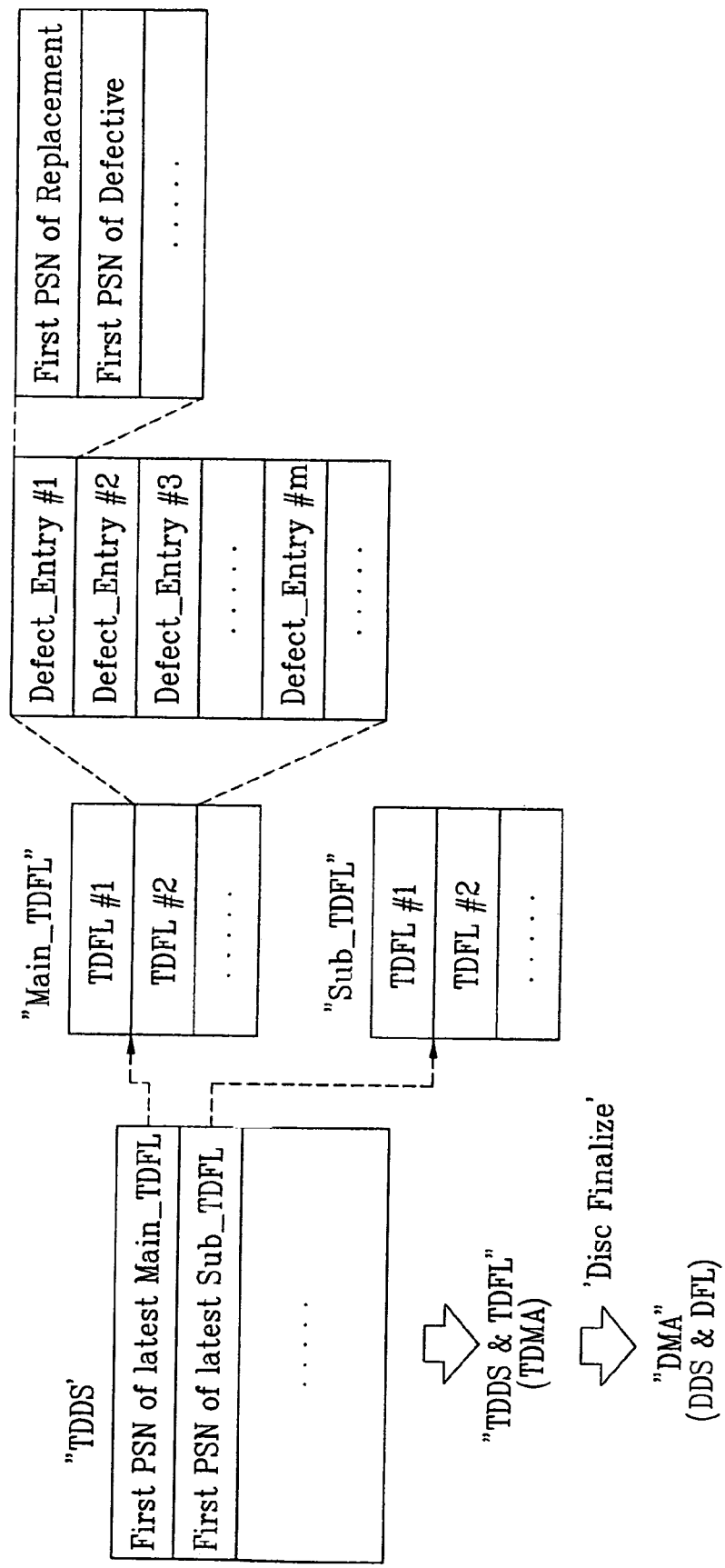
FIG. 9 illustrates management information created and recorded by the method of managing a defective area on an optical disc of write once type according to the second embodiment of the present invention.

The repeatedly recorded main and sub TDFL information, as shown in FIG. 9, includes a plurality of defect entries Defect_Entry #1-#m. A first physical sector number of the defective area First PSN of Defective and a first physical sector number where the corresponding data is replacement-recorded First PSN of Replacement may be recorded in relationship to each other in each of the defect entries.

Therefore, the optical disc recording/reproducing device 20 records the main TDFL (Main_TDFL) information and the TDDS information for rapidly accessing the repeatedly recorded main and sub TDFL information in the TDMA separately arranged in the lead-in area. Here, for example, the TDDS information, as shown in FIG. 9, includes physical sector numbers (First PSN of latest M_TDFL) and (First PSN of latest S_TDFL) for indicating a new, latest TDFL (TDFL #2) included in each of the main TDFL (Main_TDFL) information and the sub TDFL (Sub_TDFL) information.

Also, if a user requests a disc finalization for terminating the data recording on the optical disc, a series of operations for copying and recording the TDDS and main TDFL information stored in the TDMA into one or more DMAs separately arranged in the lead-in area are performed, e.g., as shown in FIG. 9.

Thus, if a defect is included in the main TDFL information recorded in the BD-WO, the optical disc recording/reproducing device 20 can alternatively or in conjunction search the repeatedly recorded sub TDFL, thereby improving the security and integrity of the TDFL information.

Figure 10:
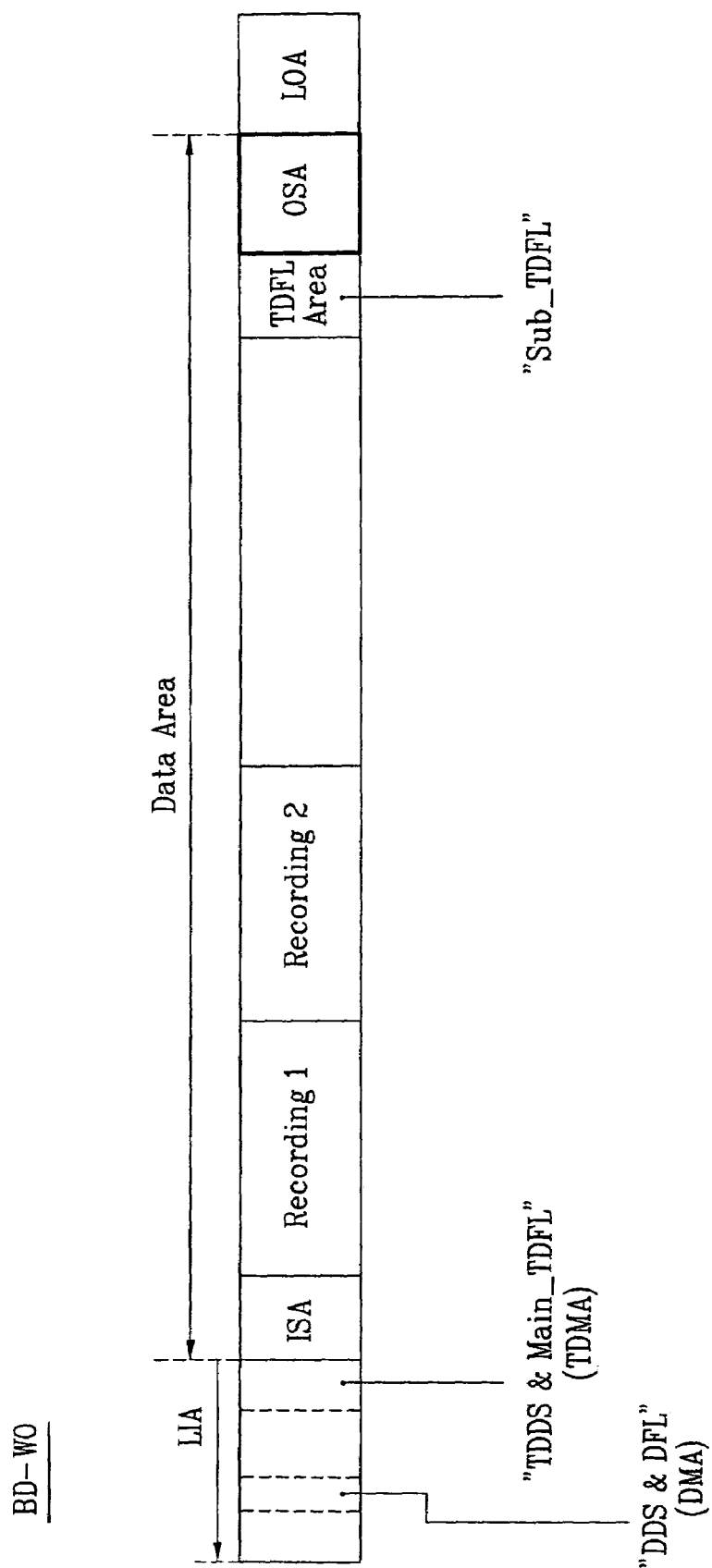
FIGS. 10 and 11 illustrate examples of the method of managing a defective area on an optical disc of write once type according to the second embodiment of the present invention.
Figure 11:
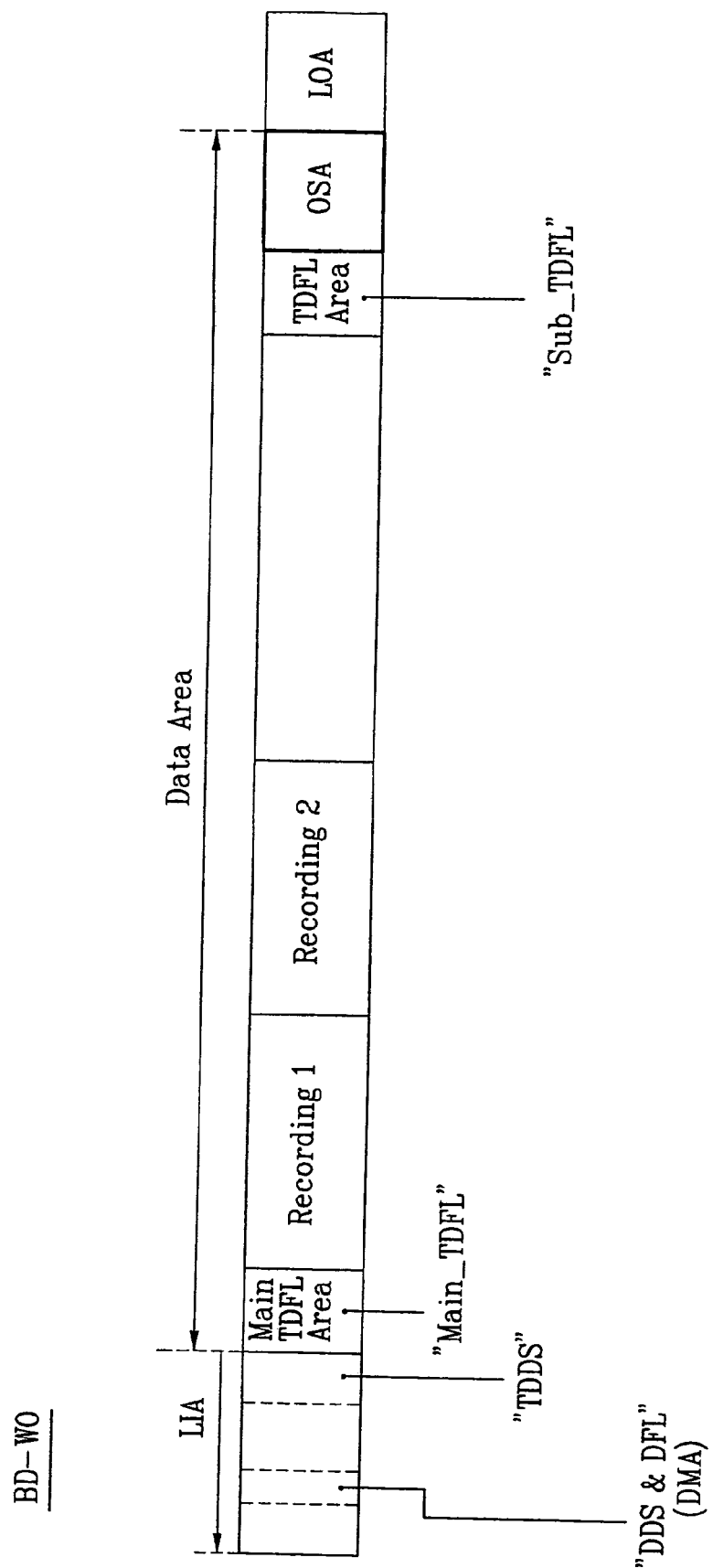

Therefore, the TDFL information may be recorded two or more times as described hereinabove. As shown in FIG. 10, the TDFL information can be recorded in the lead-in area, i.e., the recording region preceding the data area, and in the recording region at the edge of the data area (next to the OSA in FIG. 10) two or more times. Also, as shown in FIG. 11, the TDFL information may be recorded in the leading portion or the rear portion of the data area two or more times, or sequentially recorded therein.

For reference, the TDFL information repeatedly recorded at least twice according to the present invention may be dividedly recorded in another recording region in addition to the specified recording region described with reference to FIGS. 8 to 11, for example, in a partial recording region of the outer spare area or in the lead-out area. Also, the TDDS information may be repeatedly recorded at least twice to secure the stability of the information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for managing a write-once optical recording medium having at least one defective area in a user data area, wherein the optical recording medium comprises one or more temporary defect management areas and a final defect management area, and said method comprises:

(a) recording data of the at least one defective area existing in the user data area into a spare area of the optical recording medium as replacement data and providing a first temporary defect list having a defect entry for the at least one defective area;

(b) recording, in one of the one or more temporary defect management areas, a cumulative temporary defect list for an additional defective area in the user data area, wherein the cumulative temporary defect list includes the first temporary defect list previously recorded and at least one additional defect entry for any additional defective area, each defect entry including position information of a corresponding defective area and position information of replacement data to replace data of the corresponding defective area;

(c) recording, in the same temporary defect management area on which the cumulative temporary defect list is recorded, access information for accessing the cumulative temporary defect list; and (d) recording a latest cumulative temporary defect list recorded in the one temporary defect management area in the final defect management area when the optical recording medium is to be finalized, wherein after finalizing the optical recording medium no additional recording is made to the optical recording medium, wherein the one or more temporary defect management areas are separately positioned from the final defect management area.

2. The method according to claim 1, wherein the step of (c) records temporary disc definition structure information as the access information.

3. The method according to claim 2, wherein the step of (d) comprises recording a latest temporary disc definition structure information into the final defect management area when the recording medium is to be finalized.

4. The method according to claim 1, wherein the position information of the corresponding defective area indicates a first physical sector number of the corresponding defective area and the position information of the replacement data indicates a first physical sector number of the replacement data recorded in the spare area.

5. The method according to claim 1, wherein the spare area of the optical recording medium includes an inner spare area and an outer spare area, and the step of (a) utilizes at least one of the inner spare area and the outer spare area.

6. The method according to claim 1, wherein the cumulative temporary defect list is repeatedly recorded in at least two areas of the optical recording medium.

7. The method according to claim 1, wherein the one or more temporary defect management areas are located in a data area and a lead-in area of the optical recording medium.

8. The method of claim 1, wherein the cumulative temporary defect list and the access information of the cumulative temporary defect list are included in a first data block consisting of one or more clusters, and recorded in the same temporary defect management area.

9. A write-once recording medium comprising:

at least one spare area and a user data area within a data area;

one or more temporary defect management areas for managing replacement data of at least one defective area within the user data area, the one or more temporary defect management areas configured to store a plurality of cumulative temporary defect lists access information, the access information being used for accessing a corresponding cumulative temporary defect list and being stored in the same temporary defect management area on which the corresponding cumulative temporary defect list is stored, wherein one of the cumulative temporary defect lists includes management information for the replacement data of said at least one defective area cumulatively recorded and management information for replacement data for at least one additional defective area of the user data area, each defect entry of the plurality of cumulative temporary defect lists including position information of a corresponding defective area and position information of replacement data to replace data of the corresponding defective area, wherein after the recording medium is finalized no additional recording is made to the recording medium; and a final defect management area for storing a latest cumulative temporary defect list recorded in the one or more temporary defect management areas when the recoding medium is to be finalized, wherein the one or more temporary defect management areas are separately positioned from the final defect management area.

10. The recording medium according to claim 9, wherein the access information is stored as temporary disc definition structure information.

11. The recording medium according to claim 10, wherein the cumulative temporary defect list and the temporary disc definition structure information are recorded in a at least one of the one or more temporary defect management areas located in the lead-in area of the recording medium.

12. The recording medium according to claim 10, wherein the final defect management area further stores a latest temporary disc definition structure information when the recording medium is to be finalized.

13. The recording medium according to claim 9, wherein the position information of the corresponding defective area includes a first physical sector number of the corresponding defective area and the position information of the replacement data includes a first physical sector number of the replacement data recorded in the at least one spare area.

14. The recording medium according to claim 9, wherein the at least one spare area includes an inner spare area and an outer spare area, and the replacement data for the at least one defective area is located in at least one of the inner spare area and the outer spare area.

15. The recording medium according to claim 9, wherein each cumulative temporary defect list is repeatedly recorded in at least two areas of the recording medium.

16. The recording medium according to claim 9, wherein the one or more temporary defect management areas are located in the data area and a lead-in area of the recording medium.

17. The recording medium of claim 9, wherein each access information and the corresponding cumulative temporary defect list are included in a first data block consisting of one or more clusters, and recorded in the same temporary defect management area.

18. An apparatus for managing an optical recording medium having at least one defective area in a user data area, wherein the recording medium comprises one or more temporary defect management areas and a final defect management area, and said apparatus comprises:

a recording unit configured to record data of the at least one defective area into a spare area in the optical recording medium as replacement data and to provide a first temporary defect list having a defect entry for the at least one defective area;

the recording unit being configured to record, in at least one of the one or more temporary defect management areas, a cumulative temporary defect list for an additional defective area in the user data area, wherein the cumulative temporary defect list includes the first temporary defect list previously recorded and at least one additional defect entry for any additional defective area, each of the defect entry including position information of a corresponding defective area and position information of replacement data to replace data of the corresponding defective area, the recording unit being configured to record, in the same temporary defect management area on which the cumulative temporary defect list is recorded, access information for accessing the cumulative temporary defect list; and the recording unit being configured to record a latest cumulative temporary defect list recorded in the one or more temporary defect management areas into a final defect management area when the optical recording medium is to be finalized, wherein after finalizing the optical recording medium no-additional recording is made to the optical recording medium, and the one or more temporary defect management areas are separately positioned from the final defect management area.

19. The apparatus of claim 18, wherein the recording unit comprises:
a pickup configured to record/reproduce data on/from the optical recording medium; and
a controller operatively coupled to the pickup and configured to control the pickup to record the cumulative temporary defect list and the access information into the same temporary defect management area; and, when the optical recording medium is to be finalized, control the pickup to record the latest cumulative temporary defect list into the final defect management area.

20. The apparatus of claim 19, wherein the controller is configured to control the pickup to record temporary disc definition structure information as the access information.

21. The apparatus of claim 20, wherein the controller is configured to further record latest temporary disc definition structure information into the final defect management area when the optical recording medium is to be finalized.

22. The apparatus of claim 20, wherein the controller is configured to control the pickup to record, into the same temporary defect management area, a data block consisting of one or more clusters and having the cumulative temporary defect list and the access information of the cumulative temporary defect list.

23. The apparatus of claim 18, wherein the cumulative temporary defect list is repeatedly recorded in at least two temporary defect management areas.

24. The apparatus of claim 23, wherein the at least two temporary defect management areas are located in a data area and a lead-in area of the optical recording medium.

25. A method for reproducing management information for managing a defect on an optical recording medium having at least one defective area in a user data area,
wherein the optical recording medium comprises one or more temporary defect management areas and a final defect management area, and said method comprises:
before the optical recording medium is finalized, reproducing access information for accessing a cumulative temporary defect list from one of the one or more temporary defect management areas on which the cumulative temporary defect list is recorded, and reproducing the cumulative temporary defect list for managing defective areas existing in a data area from the same temporary defect management area on which the access information is recorded based on the access information, wherein the cumulative temporary defect list includes both a defect entry included in a previous temporary defect list and a new defect entry for a new defective area existing in the data area, each defect entry including position information of a corresponding defective area and position information of replacement data to replace data of the corresponding defective area, and reproducing the replacement data from a spare area of the optical recording medium based on the cumulative temporary defect list; and after the optical recording medium is finalized, reproducing a finalized cumulative temporary defect list from the final defect management area, and reproducing the replacement data from the spare area based on the finalized cumulative temporary defect list reproduced from the temporary defect management area, wherein the one or more temporary defect management areas are separately positioned from the final defect management area and no additional recording is made to the optical recording medium after finalizing the optical recording medium.

26. An apparatus for reproducing management information for managing a defect on an optical recording medium having at least one defective area in a user data area,
wherein the optical recording medium comprises one or more temporary defect management areas and a final defect management area, and said apparatus comprises:
a pickup configured to record/reproduce data on/from the optical recording medium; and
a controller operatively coupled to the pickup and configured to control, before the optical recording medium is finalized, the pickup to reproduce access information for accessing a cumulative temporary defect list from one of the one or more temporary defect management areas on which the cumulative temporary defect list is recorded, and reproducing the cumulative temporary defect list for managing defective areas existing in the data area from the same temporary defect management area on which the access information is recorded based on the access information, wherein the cumulative temporary defect list includes both a defect entry included in a previous temporary defect list and a new defect entry for a new defective area existing in the data area, each defect entry including position information of a corresponding defective area and position information of replacement data to replace data of the corresponding defective area, and to reproduce the replacement data from a spare area of the optical recording medium based on the cumulative temporary defect list; and configured to control, after the recording medium is finalized, the pickup to reproduce a finalized cumulative temporary defect list from the final defect management area, and to reproduce the replacement data from the spare area based on the finalized cumulative temporary defect list reproduced from the temporary defect management area, wherein the one or more temporary defect management areas are separately positioned from the final defect management area and no additional recording is made to the optical recording medium after finalizing the optical recording medium.

* * * * *